Oct. 27, 1970 DHU AINE J. DAVIS 3,537,092
SYNCHRONIZING INDICATOR FOR AN ADJUSTABLE VIBRATING MOTOR
Original Filed March 14, 1966
2 Sheets-Sheet 1
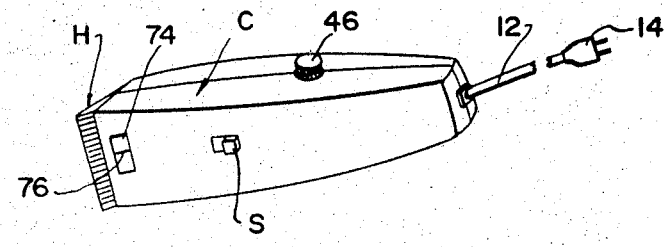
FIG.1
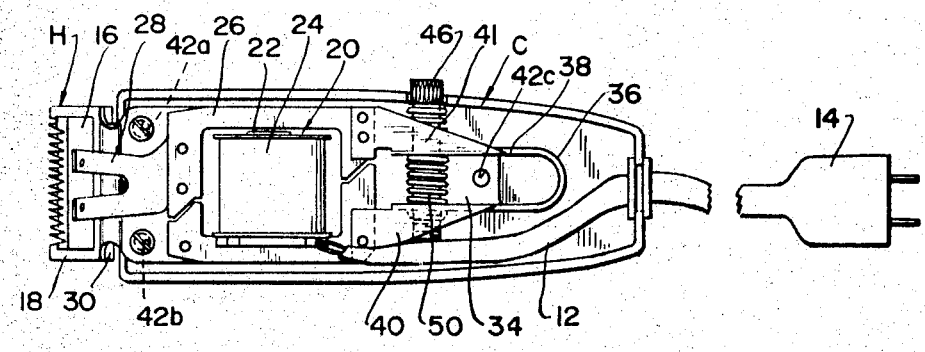
FIG.2
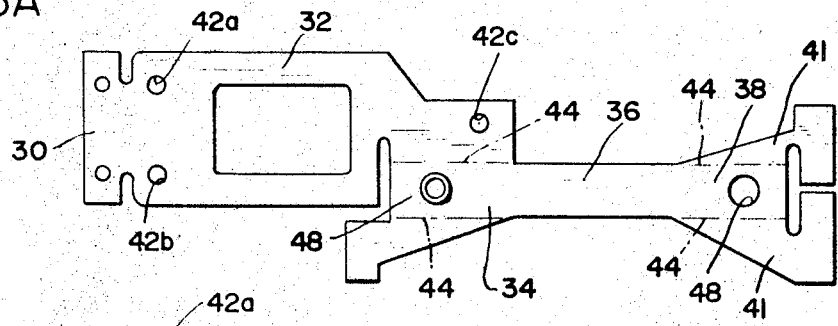
FIG.3A
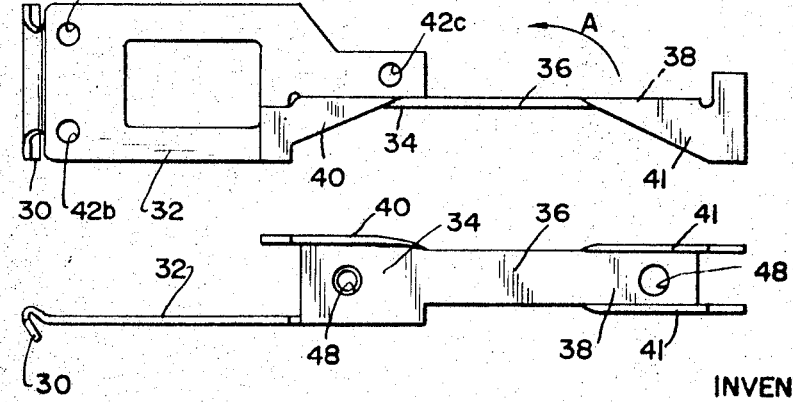
FIG.3B
FIG.3C
INVENTOR
DhuAine J. Davis
BY Hofgren, Wegner, Allen, Stellman & McCord
ATTORNEYS United States Patent Office 3,537,092
Patented Oct. 27, 1970

3,537,092
SYNCHRONIZING INDICATOR FOR AN ADJUSTABLE VIBRATING MOTOR
Dhu Aine J. Davis, Wheaton, Ill., assignor to Hermetic Coil Co., Inc., a corporation of Connecticut
Original application Mar. 14, 1966, Ser. No. 534,004, now Patent No. 3,357,101, dated Dec. 12, 1967. Divided and this application Aug. 23, 1967, Ser. No. 662,784
Int. Cl. G08b 5/38
U.S. Cl. 340—268                 3 Claims

ABSTRACT OF THE DISCLOSURE

A synchronization indicator for an electrically powered vibratory tool. A gaseous discharge lamp is energized by an alternating source to provide flashes of illumination with which the vibratory part is synchronized.

---

This application is a division of Davis application, Ser. No. 534,004, filed Mar. 14, 1966, now Pat. 3,357,101 issued Dec. 12, 1967, entitled "Hair Clipper" and assigned to the assignee of this invention.

This invention relates generally to synchronization of an electric vibratory tool.

Electric hair clippers generally include a casing within which is mounted an electromagnetic motor having a core and coil and a movable armature which oscillates a movable cutting blade in relation to a fixed cutting blade, the blades extending outside the casing. The mechanism of these clippers includes several small parts which require skilled hand assembly. The number of parts and the time necessary to assemble them make such clippers relatively expensive.

A feature of the invention is to provide a means for accurately synchronizing the mechanical movement of the vibrating portion of the tool with the electrical field of the motor. In hair clippers of the character described, the movable cutting blade has a displacement (2½ cutting teeth in the clipper shown herein) at which the motor produces its maximum power. Should the displacement of the movable blade be too great, its stroke will lag behind the alternating current supply, thus causing a "drag" which cuts down on the power of the clipper. For maximum power, the blade should reach the end of each stroke at the instant the current alternates. When the displacement of the blade is more than 2½ teeth, for instance, the blade will bypass its optimum limit of travel at the instant the current alternates and the motor will have to "drag" it back into phase, causing a loss in power. Most clippers have adjusting screws to change the displacement of the movable blade. But the proper setting of the screw is difficult for the average person to determine. Normally, the synchronization of hair clippers is done by the dealer or at a repair shop. The clipper of this invention has a built-in indicator whereby the mechanical reciprocation of the movable cutting blade can be compared directly with the frequency of the alternating current supply.

It is, therefore, an object of this invention to provide a hair clipper, or the like, having a built-in indicator which indicates proper synchronization of the vibrating portion of the clipper with the electrical field of the motor.

Other features and objects of this invention will become apparent from the following detailed description taken in conjunction with the drawings, in which:

FIG. 1 is a perspective view of a hair clipper embodying the invention;

FIG. 2 is a plan view of the clipper with a portion of the casing removed for illustration;

FIGS. 3A through 3D illustrate the unitary frame of this invention in various stages of its fabrication;

Figure 3D:
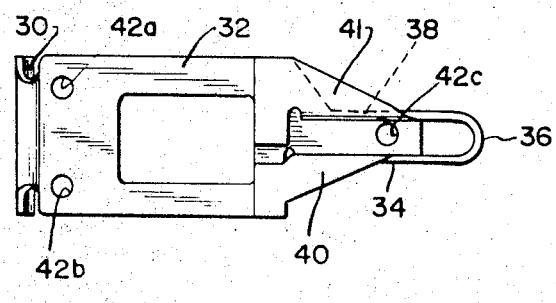

Referring to FIG. 1, a hair clipper embodying the invention is shown to comprise a casing C which houses the component parts of the clipper and has a clipper cutting head, generally designated H, at its forward end and an electrical cord 12 extending through the rear of the casing. The cord has a terminal plug 14 which is inserted into a source of alternating current. A power switch S extends through the casing for easy access by the operator.

As best illustrated in FIG. 2, an electromagnetic motor is employed for reciprocating a movable cutting blade 16 in relation to a fixed cutting blade 18. The electromagnetic motor includes an electromagnet, generally designated 20, which comprises an E core 22 having a center leg on which a coil 24 is mounted to establish a magnetic field for reciprocating an armature 26 toward and away from core 22. The coil is connected through cord 12 to the alternating current supply. As the current alternates the magnetic field in a known manner, the armature 26 will reciprocate toward and away from the core 22. The movable cutting blade 16 is connected to armature 26 by spring legs 28. The electromagnet 20 and fixed cutting blade 18 are mounted to the fixed portion of the unitary frame, as hereinafter described. The alternating current thus causes the movable blades 16 to reciprocate over the fixed blade 18 providing the shearing means for the clipper.

Figure 4:
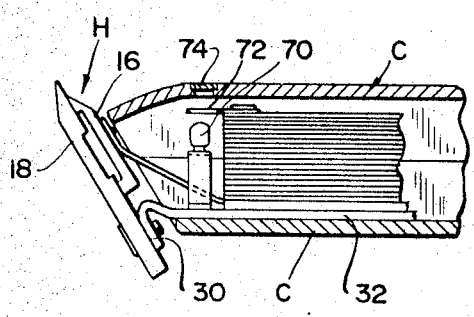
FIG. 4 is a partial side elevational view of the front of the clipper, illustrating in detail the synchronizing indicator.

The unitary frame structure of this invention is best illustrated in FIG. 3D. The unitary frame includes a forward section or lip 30 to which the fixed cutting blade 18 is mounted (FIGS. 2 and 4). The unitary frame has an intermediate body section 32 behind the forward section 30 on which is mounted the electromagnet 20 of the electromagnetic motor. An end section 34 extends away from the intermediate body section 32 at a point remote from the forward section 30, preferably at the rear of the body section, as shown in FIG. 3D. A spring loop 36 is disposed at the terminus of the end section 34 and an arm 38 extends from the spring loop 36 back forwardly toward the electromagnet in substantial parallelism with the end section 34. The end section 34 and arm 38 have stiffening flanges 40 and 41, respectively, to confine the flexing of the frame to the spring loop 36. The forward end of arm 38 has mounted thereon the armature 26 of the electromagnetic motor and the movable cutting blade of the clipper. As the current alternates, the spring loop 36 of the unitary frame permits arm 38 and the armature 26 to reciprocate toward and away from core 22 thereby reciprocating the movable blade of the clipper in relation to the fixed blade 18 on the forward end 30 of the unitary frame. The unitary frame includes three apertures 42a, 42b, and 42c (FIG. 3D) for mounting the unitary frame to the casing.

It can be seen that all of the necessary component parts of the clipper (namely, the electromagnet 20, the armature 26, and the movable and fixed cutting blades 16 and 18, respectively) are mounted directly on the unitary frame and in essence comprise an operable hair clipper without employing the structure of a casing. Obviously, this facilitates ease of construction as well as eliminating many parts and the time necessary to assemble the same, greatly reducing cost.

FIGS. 3A through 3D illustrate the unitary frame in various sequential stages of its fabrication. FIG. 3A illustrates a flat stamped blank from which the frame is formed. Dotted lines 44 (FIG. 3A) are imaginary lines along which the blank is bent to initiate the fabrication of the unitary frame resulting in a configuration as shown in FIG. 3B. The forward section 30 is also bent underneath the intermediate body section 42 to permit the fixed blade 18 to be mounted at an angle. FIG. 3C is a side elevational view of the blank in its sequential stage of FIG. 3B. The blank is then curved in the direction of arrow A (FIG. 3B) to form the final unitary frame structure as illustrated in FIG. 3D.

An adjusting screw 46 extends through apertures 48 (FIGS. 3A and 3C) between the end section 34 and arm 38 of the unitary frame. A spring 50 embraces screw 46 between end section 34 and arm 38 of the unitary frame and urges the reciprocating arm 38 and armature 26 away from the electromagnet core 22. The adjusting screw thus defines the outer limit of movement of the armature 26 and the mechanical displacement of the reciprocating cutting blade 16. The movement of the armature toward the electromagnet is limited by contact with core 22.

Figure 5:
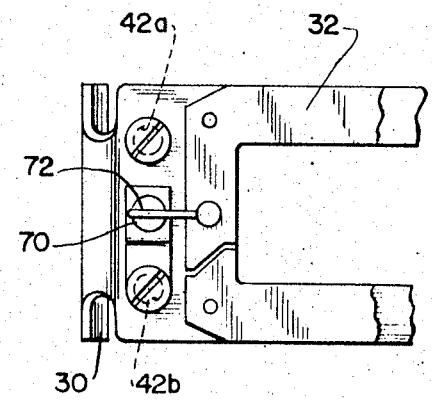
FIG. 5 is a plan view as in FIG. 4 with the casing and cutting head of the clipper removed to illustrate the synchronizing indicator.

Another feature of this invention is the provision of a synchronizing indicator adapted to indicate proper synchronization of the mechanical displacement of the vibrating movable cutting blade 16 with the alternating electrical field of the electromagnetic motor. The device employs a stroboscope to indicate the proper synchronization. In short, when a body moving with high velocity is illuminated for a sufficiently short interval of time, it appears to the eye to be at rest. If the motion recurs periodically and the body is lighted successively at precisely the same phase as its periodic or reciprocating motion, then the additive effects give a clear view of the body at a fixed position. Thus, by employing a source of successive flashes of light in phase with the alternating current of the clipper, thereby successively "freezing" the motion of the vibrating movable cutting blade, the motion of the blade can be compared directly with the frequency of the alternating current supply. The source of successive flashes of illumination in the embodiment illustrated is comprised of a gaseous discharge lamp, such as neon bulb 70 (FIGS. 4 and 5) which is mounted on the body portion 32 of the unitary frame to which the fixed blade 18 is secured. The bulb is a low voltage neon discharge tube which is in circuit with the electromagnet 20 and which produces light flashes at the same frequency as the alternating current supply. An elongate wire-like member 72 is mounted on the armature 26 to which the movable cutting blade 16 is secured. The wire 72 could likewise extend rearwardly from the movable blade itself. The wire is positioned such that it reciprocates above the neon bulb 70 in the path of the flashes of illumination emanating from the bulb. Since the electromagnetic motor is connected in the alternating current circuit with the neon bulb, a stroboscopic effect is produced by visually freezing the movement of the wire during the instant of each successive flash of illumination at precisely the same phase as its motion. The wire will thus appear as at a fixed position. Referring to FIGS. 1 and 4, the casing C is provided with a translucent window 74 with an elongate reference mark 76. The window is disposed directly above the neon bulb 70 and wire 72 and is at least as wide as the maximum displacement of the movable cutting blade 16. Thus, as the neon bulb freezes the motion of the wire, it will appear as a fixed line through the translucent window. The reference mark 76 is positioned in alignment with the position of the wire 72 when the mechanical displacement of the wire (and therefore the movable cutting blade) is in proper phase with the electric field of the electromagnetic motor. On proper phase synchronization, the "frozen" image of the wire and the reference mark appear as a single line. Should the movble blades 16 have an improper displacement, the "frozen" image of the wire and the reference mark will appear as two lines. When this happens, the adjustment screw 46 (FIG. 2) can be employed to bring the displacement of the movable cutting blade into proper synchronization. The wire 72 is but a preferred embodiment. For instance, the movable blade itself can be "frozen."

Thus, it can be seen that I have provided a new and improved hair clipper which is made sturdy and inexpensive by the provision of a novel unitary frame and which is provided with a novel synchronizing indicator to insure that the cutting blade is precisely in the same phase as the alternating current supply.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. An electric tool having a vibratory electromagnetic motor for vibrating a movable portion of the tool in relation to a fixed portion thereof, means for adjusting the mechanical displacement of the movable portion of the tool, and a synchronizing indicator adapted to indicate proper synchronization of the mechanical displacement of the movable portion of the tool with the energization of the electromagnetic motor, said synchronizing indicator including a source of successive flashes of illumination in phase with the electromagnetic motor, said source being mounted on the fixed portion of the tool at such a position that the movable portion of the tool passes through the path of the flashes of illumination thereby producing a stroboscopic effect by visually freezing the movement of the movable portion of the tool during the instant of each successive flash of illumination, and an index means mounted on the fixed portion of the tool in the path of the flashes of illumination, said index means being positioned in alignment with the position of the movable portion of the tool at the instant of each successive flash of illumination when the mechanical displacement of the movable portion is synchronized with the electromagnetic motor, manipulation of said mechanical displacement adjusting means varying the phase relation between movement of the movable portion and energization of the motor.

2. The electric tool of claim 1 wherein said fixed portion includes a translucent surface and said movable portion has an elongate wire-like member which reciprocates through the path of the flashes of illumination the member being between the surface and said source, said flashes visually freezing the shadow of the wire on said surface during the instant of each successive flash of illumination, and wherein said index means includes a reference mark on said surface.

3. The electric tool of claim 2 including a casing housing the source of flashes of illumination and the elongate wire-like member on the movable portion, said casing including a translucent window above the source of flashes of illumination and the elongate wire, said translucent window having a reference mark in alignment with the position of said elongate wire at the instant of each successive flash of illumination when the mechanical displacement of the movable portion is synchronized with the electric field of the electromagnetic motor.

References Cited

UNITED STATES PATENTS

| 2,035,759 | 3/1936 | Poole. | |
| 2,067,979 | 1/1937 | Newton. | |
| 2,193,878 | 3/1940 | Martin | 310—29 X |
| 2,449,472 | 9/1948 | Gulliksen | 310—29 X |
| 2,967,253 | 1/1961 | Wahl | 310—19 X |

DONALD J. YUSKO, Primary Examiner

D. L. TRAFTON, Assistant Examiner

U.S. Cl. X.R.

310—29; 73—67.2; 324—69; 318—490